(12) United States Patent
Siboni et al.

(10) Patent No.: US 10,689,784 B2
(45) Date of Patent: Jun. 23, 2020

(54) REFORMABLE RESIN FIBERS

(71) Applicant: Zephyros, Inc., Romeo, MI (US)

(72) Inventors: Patrick Siboni, Molsheim (FR); Laurent Meistermann, Molsheim (FR); Brandon Madaus, Richmond, MI (US); Alex Gutierrez, Greenville, SC (US)

(73) Assignee: ZEPHRYOS, INC., Romeo, MI (US)

( * ) Notice: Subject to any disclaimer, the term of this patent is extended or adjusted under 35 U.S.C. 154(b) by 352 days.

(21) Appl. No.: 15/518,042

(22) PCT Filed: Oct. 22, 2015

(86) PCT No.: PCT/US2015/056826
§ 371 (c)(1),
(2) Date: Apr. 10, 2017

(87) PCT Pub. No.: WO2016/065104
PCT Pub. Date: Apr. 28, 2016

(65) Prior Publication Data
US 2017/0247821 A1    Aug. 31, 2017

Related U.S. Application Data

(60) Provisional application No. 62/067,131, filed on Oct. 22, 2014, provisional application No. 62/238,928, filed on Oct. 8, 2015.

(51) Int. Cl.
*D03D 13/00* (2006.01)
*D02G 3/40* (2006.01)
(Continued)

(52) U.S. Cl.
CPC ....... *D03D 13/002* (2013.01); *C03C 25/1095* (2013.01); *C03C 25/36* (2013.01);
(Continued)

(58) Field of Classification Search
CPC . C03C 25/36; C03C 25/1095; D10B 2101/12; D10B 2331/14; D10B 2101/10;
(Continued)

(56) References Cited

U.S. PATENT DOCUMENTS 3,317,471 A    5/1967   Johnson et al.
3,473,950 A    10/1969  Wong
(Continued)

FOREIGN PATENT DOCUMENTS

DE        3012288 A1    10/1981
WO        98/14498 A1    4/1998
(Continued)

OTHER PUBLICATIONS

International Search Report for application No. PCT/US2015/056826. dated Mar. 15, 2016.
(Continued)

*Primary Examiner* — Vishal I Patel
(74) *Attorney, Agent, or Firm* — Bryan S. Lemanski; The Dobrusia Law Firm, P.C.

(57) ABSTRACT

The present invention contemplates a method for forming a reformable epoxy resin material into a fiber format and: (i) weaving the reformable epoxy resin material (10) with a reinforcing fiber (12) to form a woven material; (ii) stitching a secondary material (14) with reformable epoxy resin material; and optionally (iii) forming a web or mesh with the reformable epoxy resin material.

15 Claims, 2 Drawing Sheets

(51) Int. Cl.
*D03D 15/00* (2006.01)
*C08L 63/00* (2006.01)
*C03C 25/36* (2006.01)
*C08J 5/04* (2006.01)
*C03C 25/1095* (2018.01)

(52) U.S. Cl.
CPC ............... *C08J 5/04* (2013.01); *C08J 5/042* (2013.01); *C08J 5/043* (2013.01); *C08L 63/00* (2013.01); *D02G 3/402* (2013.01); *D03D 15/0011* (2013.01); *D03D 15/0027* (2013.01); *C08J 2363/00* (2013.01); *C08J 2363/02* (2013.01); *D03D 2700/0137* (2013.01); *D03D 2700/0148* (2013.01); *D03D 2700/0196* (2013.01); *D10B 2101/06* (2013.01); *D10B 2101/10* (2013.01); *D10B 2101/12* (2013.01); *D10B 2331/14* (2013.01); *D10B 2501/00* (2013.01); *D10B 2505/02* (2013.01)

(58) Field of Classification Search
CPC ............ D10B 2501/00; D10B 2505/02; D10B 2101/06; D03D 15/0011; D03D 15/0027; D03D 2700/0196; D03D 2700/0148; D03D 2700/0137; D03D 13/002; C08L 63/00; C08J 2363/00; C08J 5/04; C08J 5/042; C08J 5/043; C08J 2363/02; D02G 3/402
See application file for complete search history.

(56) References Cited

U.S. PATENT DOCUMENTS

| | | |
|---|---|---|
| 4,438,254 A | 3/1984 | Doorakian et al. |
| 4,647,648 A | 3/1987 | Silvis et al. |
| 5,115,075 A | 5/1992 | Brennan et al. |
| 6,011,111 A | 1/2000 | Brennan et al. |
| 9,586,363 B2 | 3/2017 | Siboni et al. |
| 9,745,412 B2 | 8/2017 | Tsujimura |
| 9,796,891 B2 | 10/2017 | Gleyal et al. |
| 10,137,676 B2 | 11/2018 | Siboni et al. |
| 2007/0270515 A1* | 11/2007 | Chmielewski ........ C08F 283/04 520/1 |
| 2012/0128976 A1* | 5/2012 | Steele .................. B29C 70/465 428/373 |
| 2014/0335355 A1* | 11/2014 | Ettin .................... D01D 5/0885 428/373 |
| 2015/0096663 A1* | 4/2015 | Siboni ........................ C09J 5/06 156/73.1 |
| 2016/0046047 A1 | 2/2016 | Gleyal |
| 2018/0036970 A1 | 2/2018 | Chmielewski et al. |
| 2018/0037703 A1 | 2/2018 | Richardson |

FOREIGN PATENT DOCUMENTS

| | | |
|---|---|---|
| WO | 2007/041782 A1 | 4/2007 |
| WO | 2008/010823 A2 | 1/2008 |
| WO | 2013/159339 A1 | 10/2013 |

OTHER PUBLICATIONS

Chinese First Office Action dated Mar. 20, 2018, Application No. CN201580057576.4.
Chinese Second Office Action dated Nov. 9, 2018, Application No. CN201580057576.4.

* cited by examiner

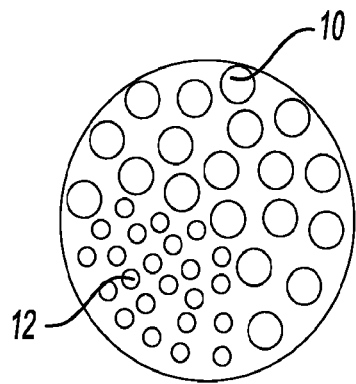
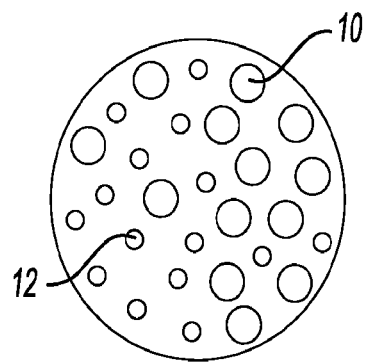
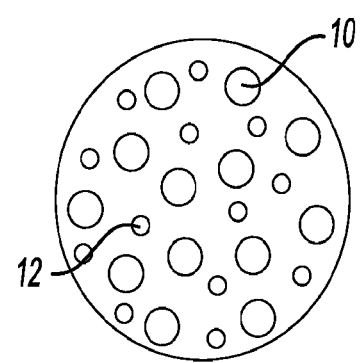
Fig-1A          Fig-1B          Fig-1C
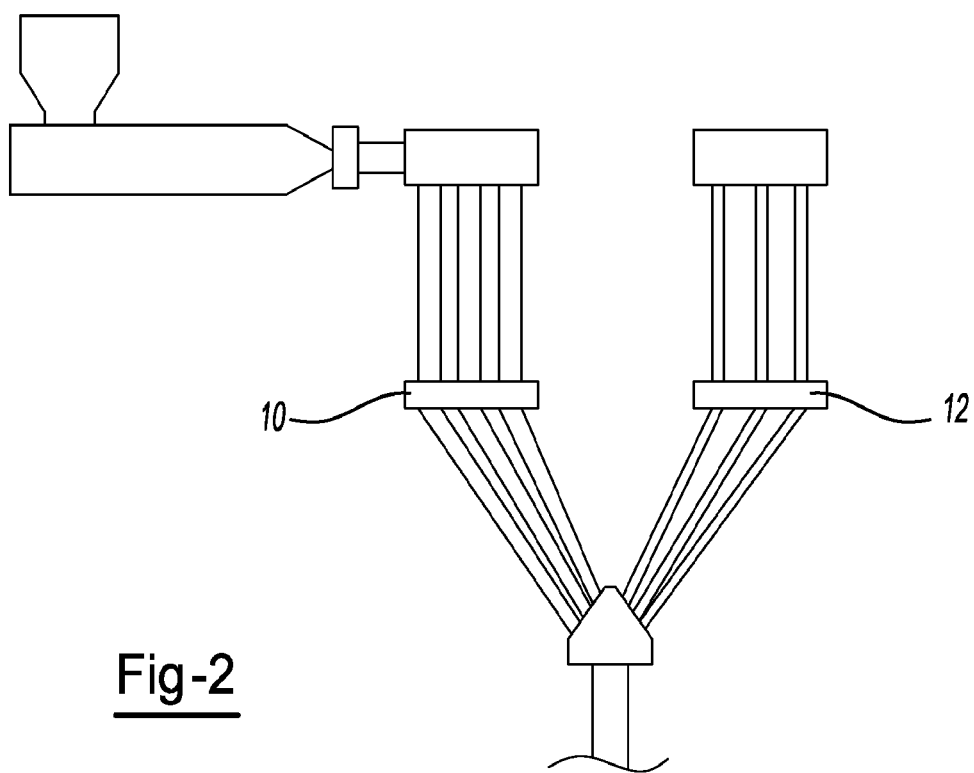
Fig-2

REFORMABLE RESIN FIBERS

TECHNICAL FIELD

The present invention pertains generally to reformable epoxy resins for use in fiber-based materials, and more particularly to reformable epoxy resin yarn, binders and co-weaved fibers.

BACKGROUND

Industrial fiber materials often require means to hold or bind materials together. Often, thermoplastic materials (e.g., fibers) are used to stitch or bind the materials together. However, such current methods include a number of drawbacks including but not limited to the incompatibility of typical thermoplastics with secondary materials (in particular epoxy-based composite materials), lack of sufficient blending, yarn showing through composite surfaces, behavior of thermoplastics upon sanding or cutting of secondary materials, rigidity of typical thermoplastics and lack of reformability of typical thermoplastics.

Thermoplastic polymers having at least one epoxide group have been described in U.S. Pat. Nos. 5,115,075; 4,438,254; 6,011,111; and WO 98/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 20070270515 (Chmielewski et al), incorporated by reference for all purposes.

The use of such thermoplastic polymers in a composite material has been disclosed in WIPO Patent Application WO/2008/010823 (addressing in situ reaction of an epoxy and an amine after impregnation), incorporated by reference herein.

There is thus a need for materials that have certain thermoplastic capabilities in that they can be formed as fibrous materials for weaving or stitching or forming webs/meshes and yet avoid the issues identified above.

SUMMARY OF THE INVENTION

The teachings herein are directed to a method comprising forming a reformable epoxy resin (RER) material into a weavable format, weaving the RER material with a reinforcing fiber to form a woven material and heating the woven material to form a flexible thermoplastic blanket. The reinforcing fiber may be selected from the group consisting of glass fibers, carbon fibers, and combinations thereof. The method may include forming the RER material into a multi-filament yarn. The RER material may fall below its glass transition temperature upon exposure to ambient temperature. The flexible thermoplastic blanket may be molded to form a composite. One or more of the denier or diameter of the weavable RER may be substantially similar to that of the reinforcing fiber. The RER material may fall below its glass transition temperature prior to forming the composite. A resulting fiber may be free of any phenoxy-containing material.

The teachings herein further contemplate a method comprising forming a RER material into a weavable yarn, stitching a multiaxial fabric with the weavable yarn and forming a composite with the multiaxial fabric. The composite may be an epoxy laminate. The composite may be substantially free of any polyester yarn. The method may be substantially free of surface treatment for forming class A surfaces. The method may be substantially free of any surface treatment after a sanding step or cutting step.

The teachings herein further include a method comprising forming a RER material into a fiber, forming a web or mesh with the RER fiber, applying the web or mesh to a secondary material, and heating the web or mesh and secondary material so that the web or mesh binds the secondary material. This method of forming a pre-form may be substantially free of any step of removing the web or mesh from the secondary material. The secondary material may be an epoxy material. The RER material may be formed into a film material. The applying step may include injecting the web or mesh into the secondary material. Formation of a pre-form significantly reduces cycle time by eliminating the step of shaping the part in a tool.

Any of the methods described herein may include one or more of the following. The shelf life of the RER material may be at least about 3 months, at least about 6 months, at least about 1 year, or even at least about 5 years. The RER material may be recyclable. The glass transition temperature of the RER material may be higher than room temperature but lower than 200° C. The RER material may be processed at a temperature of less than 200° C., or even less than 150° C. The RER may be treated to reduce the viscosity of the RER material during the forming of the RER into the weavable format or yarn. The RER material may include a difunctional epoxy resin component and an amine component. The ratio of the difunctional epoxy resin and the primary amine may be modified to reduce the viscosity of the RER material during the forming of the RER into the weavable format or yarn. The RER material may fall below its glass transition temperature upon exposure to ambient temperature. The weavable format of the reformable epoxy resin material may have a tenacity of at least about 1.0 cN/dtex, at least about 1.2 cN/dtex or even at least about 1.4 cN/dtex.

The teachings herein facilitate a process for forming and utilizing weavable reformable epoxy resin materials, which may be reformable epoxy resin yarns.

DESCRIPTION OF THE DRAWINGS

FIG. 1A illustrates a cross-sectional view of an exemplary fibers of reformable epoxy resin material shown bunched with reinforcing fibers.

FIG. 1B shows the reformable epoxy resin fibers of FIG. 1A commingled with the reinforcing fibers of FIG. 1A.

FIG. 1C shows the reformable epoxy resin fibers of FIG. 1A equally dispersed within the reinforcing fibers of FIG. 1A.

FIG. 2 illustrates an exemplary extruding process for forming the commingled materials described herein.

DETAILED DESCRIPTION

Figure 3:
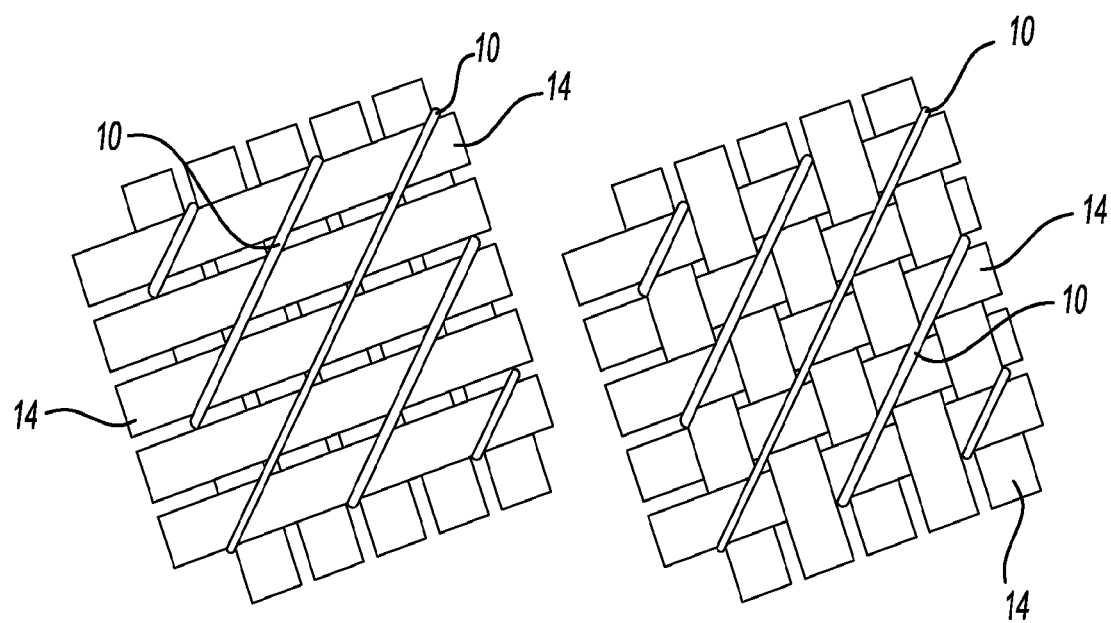
FIG. 3 illustrates an exemplary stitching of a secondary material with the reformable epoxy resin yarn described herein.

The present teachings meet one or more of the above needs by the improved composite structures and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing dates of U.S. Provisional Application Nos. 62/067,131, filed Oct. 22, 2014 and 62/238,928, filed Oct. 8, 2015. The entirety of the contents of these applications are hereby incorporated by reference for all purposes.

The teachings herein make advantageous use of a RER epoxy yarns that adhere when cooled. The teachings herein contemplate a method for providing composite structures or other molded structures that are assembled (e.g., stitched or formed with a web or mesh) with the yarns (e.g., weavable reformable epoxy resin materials) described herein. The resulting structures are formable and moldable after the RER material is heated and subsequently falls below its glass transition temperature. The RER yarns are particularly compatible with dissimilar reinforcing fibers and epoxy based secondary materials such that the compatibility is improved over typical thermoplastic fibers (e.g., polyester).

The teachings herein provide for a number of uses for the RER (reformable epoxy resin) fibers. In one embodiment, the RER fibers may be commingled with reinforcing fibers. Examples of which include but are not limited to glass or carbon fibers. The RER fibers may be more compatible with the reinforcing fibers as compared to typical thermoplastic fibers. This may be due to the similarity in size, diameter and/or denier of the RER fibers and reinforcing fibers. These commingled fibers can be used to produce drapable materials and composites which are easier to form than rigid composites, enable more complex shapes, require less heat/energy to process, and has a higher modulus than typical thermoplastic fibers. An example of such commingling possibilities are depicted at FIGS. 1A-1C, where varying degrees of commingling are shown with the RER fibers 10 and reinforcing fibers 12. A possible processing method is depicted at FIG. 2 where the RER fibers 10 and reinforcing fibers 12 are co-extruded.

In another embodiment, the RER fibers may be used for stitching together secondary materials (which may be multiaxial fabric materials). An example is shown at FIG. 3 where the RER yarn 10 is stitched into a secondary material 14. In the event that such stitching were utilized to form epoxy laminates, the RER fiber would blend into the epoxy-based material upon heating in a way that typical thermoplastic fibers cannot. Such blending also results in an increase in toughness of the resulting resin, improved appearance, and reduces the need for secondary finishing. As just one example, typical polyester yarn shows through the laminate and is thus visible on surface requiring additional treatment steps for a Class A finish. In addition, polyester yarn shows (sticks upward and outward) when a laminate is cut or sanded requiring additional treatment.

In yet another embodiment, the RER fibers may be modified to form a web or mesh which may then be contacted with a secondary material and may serve to bind that secondary material without requiring removal of the web or mesh. The secondary material may be an epoxy material and thus particular compatible with the RER web or mesh. The RER material may be formed into a film material and the film may be used to form the web or mesh. The RER fiber/web/mesh may also be injected into the material to facilitate the binding process.

The materials and methods taught herein include possible uses for RER materials. It is possible that the RER materials may be provided initially in a pellet form and then formed into the weavable fibers (e.g., yarn) described herein.

Figure 4:
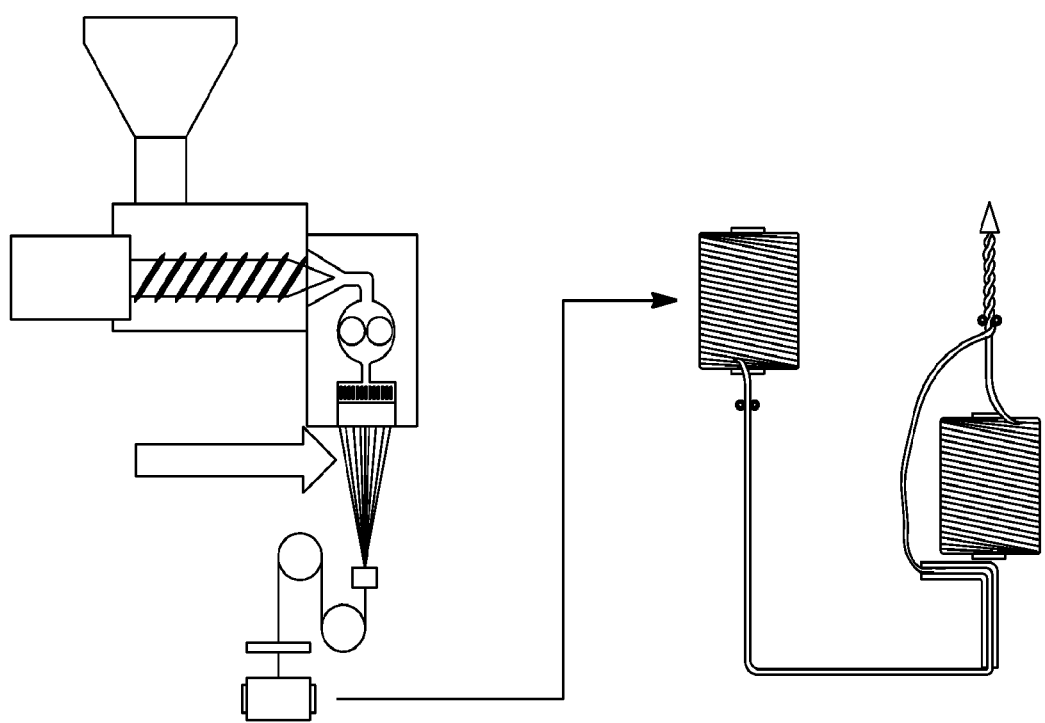
FIG. 4 illustrates an exemplary process for forming the commingled materials described herein.

As shown for example at FIG. 4, the RER material may be provided as pellets to a feed hopper which leads directly to a feed screw which leads to a melt block, where the pellets are melted from a solid to a viscous liquid. The RER material moves from the melt block to a spinneret via the force from a melt pump. Upon feeding through the spinneret, the material is formed into fibers and pulled onto a bobbin via a series of godets and a yarn traverse.

Yarns produced via the above method were tested for tenacity. A first yarn, produced with 24 fibers and twisted slightly, had a count of 100 dtex and a resulting tenacity of 1.2 to 1.4 cN/dtex. A second yarn, produced with S (right) and Z (left) twisted (highly twisted) fibers, had a count of 198 dtex and a tenacity of 1.2 cN/dtex. Thus, tenacity was unexpectedly not improved with a higher fiber mass density or increased twisting.

The processing temperature may affect the yarn formation process in that the viscosity of the RER materials my require adjustment to form the desired fibers and yarns. Specifically, the materials may require processing at a temperature of at least 150° C., at least 170° C., at least 190° C. or even at least about 200° C. At lower processing temperatures the viscosity of the materials may be too high for formation into fibers. In one embodiment it is possible that the material is formulated to have a lower viscosity (sufficient for forming into fibers) even at temperatures below 200° C., below 170° C., or even below 150° C. However, the temperature for processing the RER materials may continue to be below that of the temperature required to process fibers formed of other materials such as typical thermoplastics. The use of lower processing temperatures reduces the risk of thermal stability of the fiber materials during processing and also allows for easier cooling of the fibers. Cooled fibers minimize any unwanted fiber tackiness so that the fibers are not sticky when wound.

A key advantage of the present teachings over existing commonly used fibers (e.g., polyester fibers) is the improved compatibility with other materials including epoxy-based thermoset epoxy resin matrix materials (commonly utilized in composite structures). Specifically, the RER may be an amine terminated resin that can potentially react with a thermoset resin. The compatibility lies in the RER fibers being epoxy based and having a size that is commonly used in composite fabrics. Additional benefits of the RER material include fast adhesion, and also the ability to re-form and re-mold the yarn with the addition of heat. Adhesion and returning to a solid state upon cooling of the RER begins almost immediately after heating is stopped and full adhesion can occur within about 10 seconds to about 60 seconds (e.g., about 30 seconds). In addition, a RER may be desirable because of its long shelf life. It also may not require storage at a refrigerated temperature, unlike some alternative materials.

As an example, the RER material may be and/or may include a product (e.g., a thermoplastic condensation reaction product) of a reaction of a mono-functional or difunctional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages. Exemplary RER materials are made with a difunctional epoxy resin and a primary amine which may be bisphenol A diglycidyl ether (BADGE) and monoethanolamine. For some applications that may require a higher glass transition temperature ($T_g$), it is contemplated that BADGE may be replaced by an epoxy monomer with less mobility. Such epoxy monomers may include diglycidylether of fluoren diphenol or 1,6 napthalene diepoxy. Also, it is contemplated that where fire resistance is desired, BADGE can be replaced by a brominated bisphenol A epoxy resin. Alternatively, the RER materials disclosed herein may also be known as poly(hydroxyamino ether) (PHAE) and is illustrated in U.S. Pat. Nos. 5,164,472; 5,275,853; 5,401,814 and 5,464,924, all incorporated by reference herein for all purposes. Such polyethers may be prepared by reacting a diglycidyl ether of dihydric aromatic compounds such as the diglycidyl ether of bisphenol A, or a diepoxy-functionalized poly(alkylene oxide) or mixture thereof with a primary amine or a secondary diamine or a monoamine functionalized poly(alkylene oxide) or mixture thereof. Such material generally has a relatively high flexural strength and modulus—often much higher than typical polyolefins (i.e. polyethylene and polypropylene)—and has the added benefit of being melt processable at temperatures of 150 to 200° C. Though other epoxide-containing moieties may be employed, as is taught in U.S. Pat. No. 6,011,111 (incorporated by reference; see, e.g., Cols. 5-6), and WO 98/14498 (incorporated by reference; see, e.g., page 8) such moieties may include at least one mono-functional epoxide and/or a di-funtional epoxide ("diepoxide"). An example of a diepoxide that can be employed in the teachings includes a diglycidyl ether of a dihydric phenol (e.g., resorcinol, biphenol or bisphenol A). Any epoxide-containing moiety herein may be an aliphatic and/or an aromatic epoxide.

Other examples of illustrative materials, functional species and diepoxides are described in U.S. Pat. Nos. 5,115,075; 4,438,254; 6,011,111; and WO 98/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 20070270515 (Chmielewski et al), incorporated by reference for all purposes.

Forming the RER materials into the desired weavable format may require particularly high temperatures during the extrusion process. Accordingly, it may be necessary to reduce the viscosity of the RER as the heat tends to increase the viscosity to an undesirable range. This may be achieved by modifying the ratio of the difunctional epoxy resin and primary amine such that the molecular chain length is reduced thus reducing the viscosity.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method comprising:
   i. forming a reformable epoxy resin material in pellet form into a weavable yarn free of any phenoxy-containing material, wherein the reformable epoxy resin includes a difunctional epoxy resin component and an amine component;

ii. stitching a multiaxial fabric with the weavable yarn, wherein the multiaxial fabric is made from an epoxy resin material that is similar to the epoxy resin material that forms the weavable yarn; and iii. forming a laminate with the multiaxial fabric, wherein the weavable yarn blends into the multiaxial fabric upon heating so that the laminate is free of visible weavable yarn strands showing through a surface of the multiaxial fabric.

2. The method according to claim 1, including a reinforcing fiber in the multiaxial fabric, the reinforcing fiber selected from the group consisting of glass fibers, carbon fibers, and combinations thereof.

3. The method according to claim 1, including forming the reformable epoxy resin material into a multi-filament yarn.

4. The method according to claim 1, wherein the reformable epoxy resin material falls below its glass transition temperature upon exposure to ambient temperature.

5. The method according to claim 2, wherein one or more of the denier or diameter of the weavable reformable epoxy resin is substantially similar to that of the reinforcing fiber.

6. The method according to claim 1, wherein the reformable epoxy resin material falls below its glass transition temperature prior to forming the laminate.

7. The method according to claim 1, wherein the laminate is substantially free of any polyester yarn.

8. The method according to claim 1, wherein the method is substantially free of surface treatment for forming class A surfaces.

9. The method according to claim 1, wherein the method is substantially free of any surface treatment after a sanding step or cutting step.

10. The method of claim 1, wherein the laminate includes an epoxy material layer separate from the reformable epoxy resin yarn.

11. The method according to claim 1, wherein the ratio of the difunctional epoxy resin and the primary amine is modified to reduce the viscosity of the reformable epoxy resin material during the forming of the reformable epoxy resin into the weavable format or yarn.

12. The method according to claim 1, wherein the reformable epoxy resin material is made with bisphenol A diglycidyl ether (BADGE) and monoethanolamine.

13. The method according to claim 1, wherein the heating is done at a temperature of at least 150° C.

14. The method according to claim 1, wherein the blending of the weavable yarn into the multiaxial fabric results in an increase in toughness of the laminate when compared to a stitching the multiaxial fabric with a typical thermoplastic fiber.

15. The method according to claim 1, wherein the reformable epoxy resin adheres to the multiaxial fabric and returns to a solid state within about 10 seconds to about 60 seconds after the heating is stopped.

* * * * *